No. 866,497. PATENTED SEPT. 17, 1907.
A. E. MENNE.
PROCESS FOR DOING AWAY WITH BLOW HOLES AND LIKE FLAWS
IN CASTINGS.
APPLICATION FILED JAN. 9, 1905.
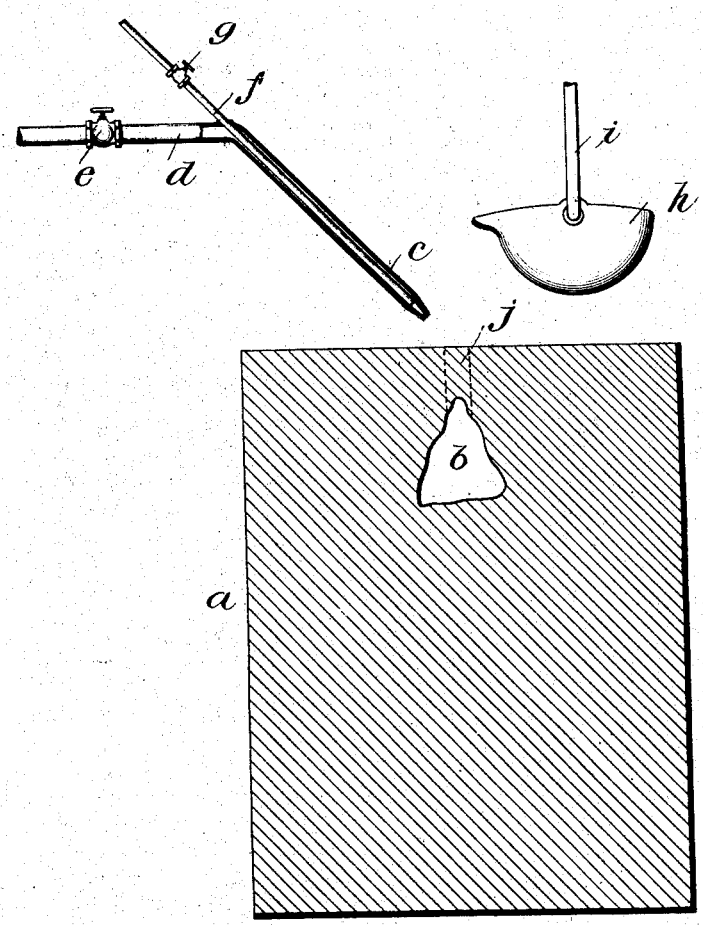
Witnesses
Geo. H. Byrne.
W. Mars. Duvall.
Inventor
A. E. Menne.
By Wilkinson & Fisher
Attorneys.

UNITED STATES PATENT OFFICE.

ADOLPH ERNST MENNE, OF CREUZTHAL, GERMANY, ASSIGNOR TO THE FIRM OF CÖLN-MÜSENER BERGWERKS AKTIEN VEREIN, OF CREUZTHAL, GERMANY.

PROCESS FOR DOING AWAY WITH BLOW-HOLES AND LIKE FLAWS IN CASTINGS.

No. 866,497.　　　　Specification of Letters Patent.　　　　Patented Sept. 17, 1907.

Application filed January 9, 1905. Serial No. 240,352.

*To all whom it may concern:*

Be it known that I, ADOLPH ERNST MENNE, a subject of the German Emperor, and a resident of Creuzthal, Westphalia, Germany, have invented new and useful Improvements in Processes for Doing Away with Blow-Holes and Like Flaws in Castings. of which the following is a specification.

My invention relates to a process for doing away with blow holes, and similar hollows in castings by means of an oxidizing gas or gases. It is particularly applicable to steel castings, and the oxidizing gas which I prefer to use is pure oxygen, or oxygen mixed with a small proportion of air or hydrogen.

Heretofore it has been proposed to melt down the tops of ingots by means of an electric arc after a partial crust has formed, in order to do away with blow holes, but it is essential in such operations that the application of the arc be to the underside of the ingot in order that the molten metal may run out. In other words, such operations require that the hot ingot be turned upside down before the arc is applied, and if the advantages attending the use of carbon electrodes are to be secured, then the disadvantage of hardening the molten metal by the addition of carbon thereto is encountered. Furthermore, a very large arc with its attendant large generating plant and other apparatus must be employed if a great speed in the melting is to be obtained. Also, I have heretofore melted hardened masses, such as slags, the tapping holes and the residues in furnaces, etc., by means of a gas jet, but these operations were directed to a different process from that herein disclosed, as will more fully appear hereinafter.

The object of my invention is to avoid the objections heretofore encountered in doing away with blow holes, and to that end it consists in suitably placing the ingot preferably with its top end or head uppermost, and in employing a jet of oxygen under considerable pressure and in sufficient volume to burn out, as well as eject the molten metal, all as more particularly stated below.

In the accompanying drawing, the figure represents a casting with a blow hole therein, an oxyhydrogen blow pipe for melting the upper part of the casting to reach the blow hole, and a ladle for supplying additional molten metal.

It is well known that in making large castings, especially of iron or steel, blow holes are likely to form more especially at or near the top of the same, and these blow holes will form even while the interior of the casting is still at a yellow heat. In carrying out my invention to do away with such blow holes either by remelting the entire top of the casting, or else by melting away a portion of the casting so as to reach the blow hole, in both cases using the gas under considerable pressure, and then I may pour in additional molten metal.

$a$ represents in section a casting, $b$, a blow hole near the upper part thereof, and $c$ an oxyhydrogen blow pipe consisting of a pipe $d$ provided with a cock $e$ for supplying hydrogen, and a pipe $f$ provided with a cock $g$ for supplying oxygen, the pipe $f$ leading into the interior of the pipe $d$.

$h$ represents a ladle adapted to be swung from any suitable support on bars $i$.

$j$ in dotted lines, represents the hole which it is intended to burn or melt to reach down to the blow hole $b$.

The oxyhydrogen blow pipe is of course movable. Instead of using an oxyhydrogen blow pipe, the top of the casting $a$ may be heated by placing fuel thereon, and a current of oxygen directed thereupon.

The stream or jet of oxygen gas directed for a time upon the surface of the casting, while said casting is setting, has for its object first either to keep the upper part of the casting liquid by means of the heat generated by the partial combustion of the steel, or to make it liquid again in order that it will flow into the holes which have formed, or secondly, to bore through the already rigid surface in order to prepare a way to the hollow which can then be filled up by pouring in an additional supply of molten metal. The surface of the steel is often still so hot that the oxygen ignites the steel. If this is not the case, the combustion of the steel must first be started in some suitable manner, as by the oxyhydrogen blow pipe.

After the combustion is well started, the supply of hydrogen is wholly or partially cut off in the pipe $d$, so that the oxygen issues through the inner tube in large excess, or even alone. Oftentimes the oxygen must be under a high pressure, even as high as 30 atmospheres in order to throw up the melted mass around the point where the stream of oxygen strikes the casting. As the steel burns, it forms an oxid $Fe_3O_4$, and experiments have shown that the resulting oxid rises as a thin liquid slag, so that on subsequently pouring in additional molten metal, a perfect weld or sweating takes place on the walls of the hollow.

By means of this process only small heads, or in favorable cases no heads at all, are required.

I find it desirable in most cases to heat the oxygen before it is delivered upon the surface of the casting.

What I claim as my invention, and desire to secure by Letters Patent, is:—

1. A process for doing away with hollows in castings, consisting in suitably placing the same then applying an oxidizing gas under pressure to the top surface of the casting then suitably starting the combustion of the gas and then partially igniting and melting the material of the casting and ejecting the material until the hollows are reached and then filling up said hollows with liquid metal, substantially as described.

2. A process for doing away with hollows in castings, consisting in suitably placing the casting then applying and igniting an oxidizing gas under sufficient pressure to the top surface part of the said casting to eject the burned and molten metal and until the hollows in the interior of the casting are exposed and their walls are at a sufficient temperature to permit a good weld with any suitable molten metal that may be poured into the same, and in subsequently pouring molten metal into said hollows and filling them up, substantially as described.

3. A process for doing away with hollows in castings, consisting in preliminarily heating and igniting an oxidizing gas and in suitably placing the casting and applying the ignited gas to the top surface of the casting at a pressure sufficient to eject the burned and molten metal until the hollows are reached, and their walls are at a temperature and in a condition suitable for welding and then pouring in molten metal until said hollows are filled, substantially as described.

4. A process for doing away with hollows in castings, consisting in suitably placing the casting, and heating up the surface of the same, then in applying oxidizing gas to the top surface of said casting under a pressure sufficient to eject the burned and molten metal, until the hollows are reached and until the walls of the same are in a suitable welding condition, and finally pouring molten metal into said hollows and permitting the same to become welded to the casting, substantially as described.

In testimony whereof, I have signed my name to this specification, in the presence of two subscribing witnesses.

ADOLPH ERNST MENNE.

Witnesses:
WILLIAM KUEPPER,
GOH. SCHOLZ.